No. 785,176. PATENTED MAR. 21, 1905.
P. MOMMERTZ.
LINED PIPE.
APPLICATION FILED SEPT. 20, 1904.
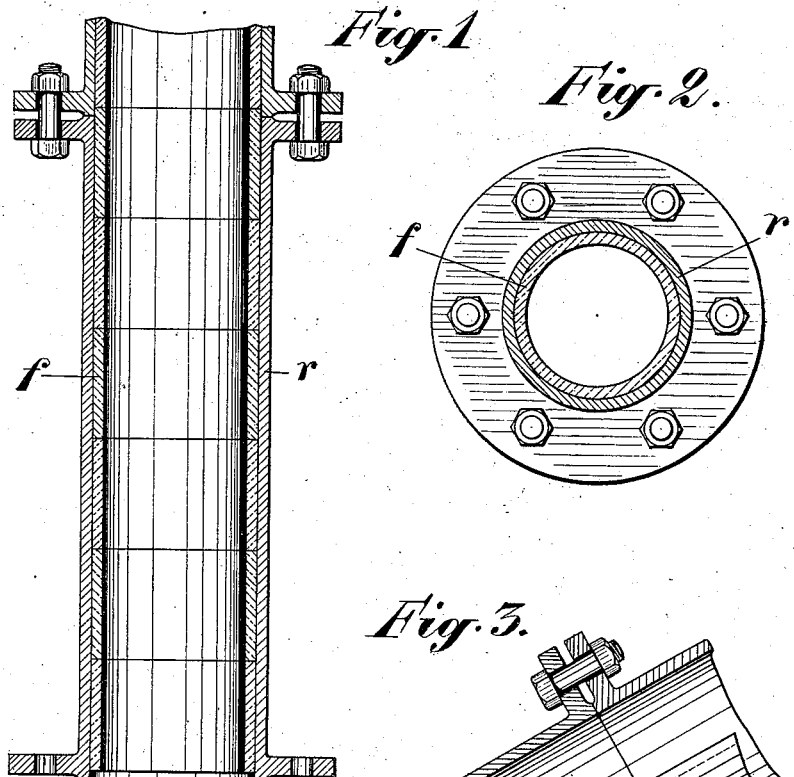
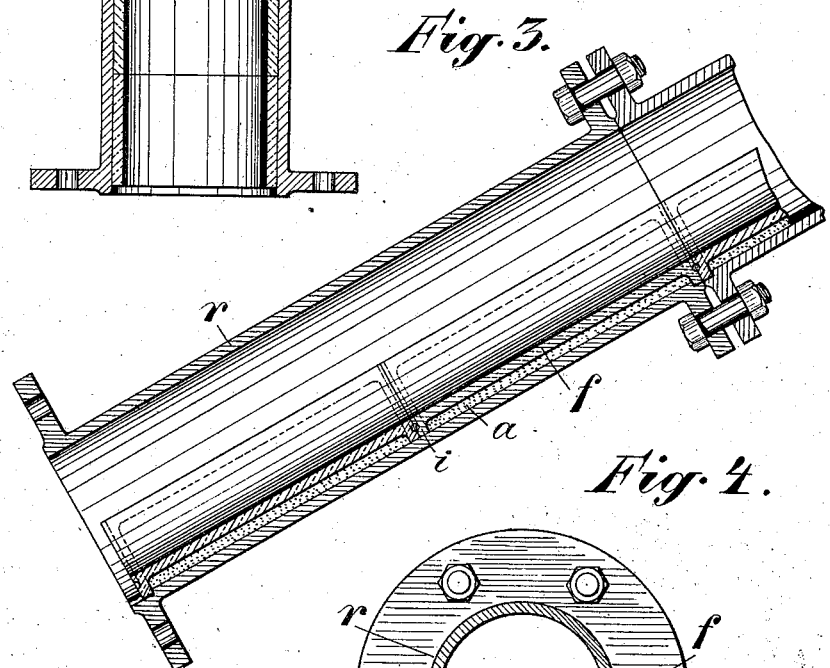

No. 785,176. Patented March 21, 1905.

UNITED STATES PATENT OFFICE.

PETER MOMMERTZ, OF MARXLOH, NEAR RUHRORT, GERMANY.

LINED PIPE.

SPECIFICATION forming part of Letters Patent No. 785,176, dated March 21, 1905.

Application filed September 20, 1904. Serial No. 225,230.

*To all whom it may concern:*

Be it known that I, PETER MOMMERTZ, a citizen of the German Empire, residing at Marxloh, near Ruhrort, Germany, have invented certain new and useful Improvements in Lined Pipes, of which the following is a specification.

In filling worked-out excavations in mines pipe-conduits are used through which sand, ground slag, or other small-grained materials are passed by means of washing. These pipes are, however, usually worn out very soon, owing to the friction of the sharp-edged material passing through.

My invention relates to a construction which intends to remove this disadvantage. It is illustrated on the drawings herewith, in which—

Figure 1 is a section of a vertical pipe-conduit, and Fig. 2 a cross-section of the same, while Fig. 3 is a longitudinal section of a pipe tion of the position, and Fig. 4 a cross-section inclined latter.

As shown by the said figures, I provide the pipes *r* with a lining *f*, consisting of a glass tube or of stone, porcelain, steel, or any hard material suitable to resist friction. As this lining is protected by the inclosing pipe, it matters not if it is composed of a material liable to break, if it is only possessed of the required hardness and smoothness. If the material of the lining should so require, as in case of glass, porcelain, or the like, it may as well be protected by a further lining of wire-gauze or other suitable protector.

I prefer to use as pipe-conduits pipes of cast or wrought iron provided with flanges at the ends, where the adjoining pipes may be united by bolts after having received the lining described. The latter may consist of entire pipes of any of the aforesaid materials and may in vertical conduits be loosely inserted, each tubular piece being placed one above the other and tightly pressed upon each other, when the iron pipes composing the conduit are fastened together by turning the screw-bolts uniting the flanges. Between the pipe and the lining there may be inserted any suitable packing. If the lining is so inserted that it projects somewhat from the ends of the pipes, it will at the same time work as a good seal of the joints of the pipe-conduits. Any required knee or elbow pieces should be circular-shaped to admit the lining. The lining inserted as described will fully protect the pipe, and when it is worn out it may be easily removed and replaced by new material. When the said pipe-conduits are laid horizontal or inclined, as shown by Fig. 3, it is not necessary to insert in the pipes entire tubes; but a trough or gutter covering the bottom half of the pipe will be sufficient, as only this part is exposed to the sand. The gutter-lining pieces are provided with ribs *i*, by which they rest in the pipe, and the space between the lining and the pipe may be filled with sawdust, peat, or similar packing *a*.

Having now fully described the nature of my invention, what I claim as new, and desire to protect by Letters Patent, is—

In a pipe, the combination of a pipe-section with a lining having ribs that engage the pipe-section, and a packing intermediate the ribs, substantially as specified.

In testimony whereof I have hereunto subscribed my name in the presence of two witnesses.

PETER MOMMERTZ.

Witnesses:
- WILLIAM ESSENWEIN,
  PETER LIEBER.